Dec. 19, 1961  L. G. SIMJIAN  3,013,345
VEHICLE DRIVER TRAINING DEVICE
Original Filed Dec. 4, 1957
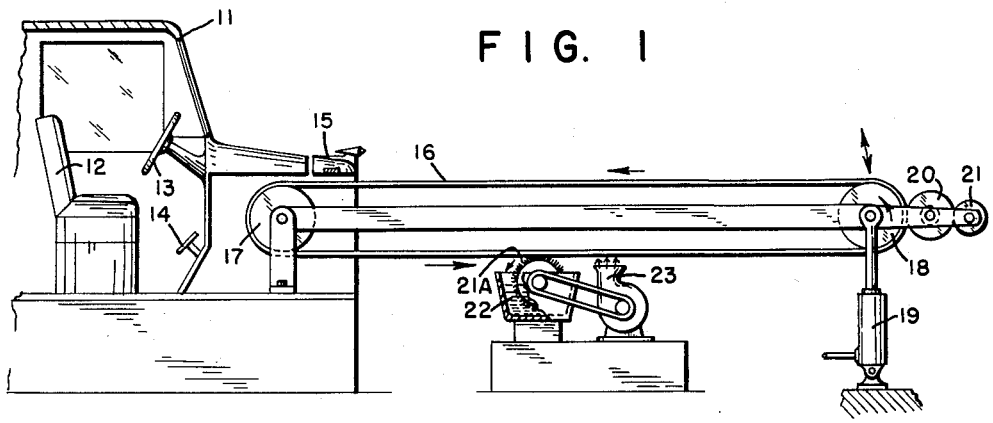
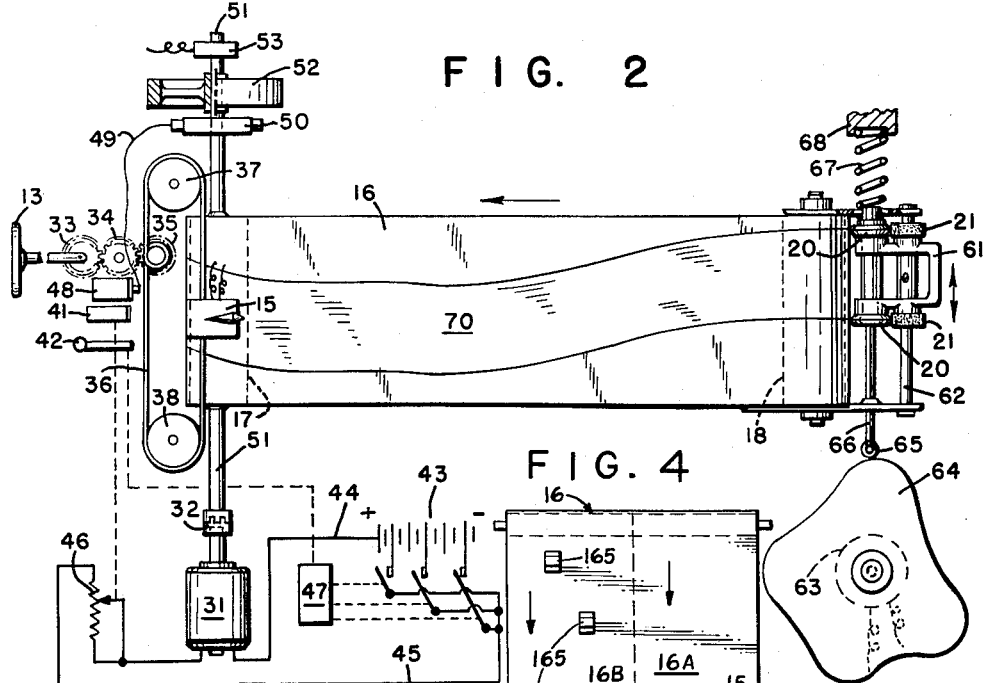
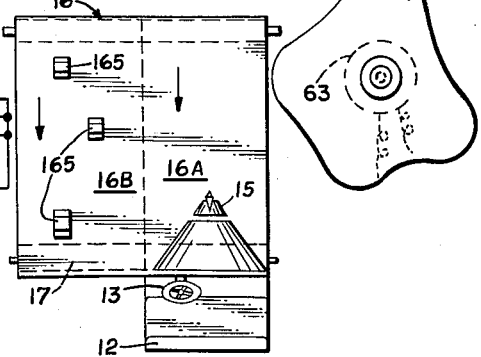
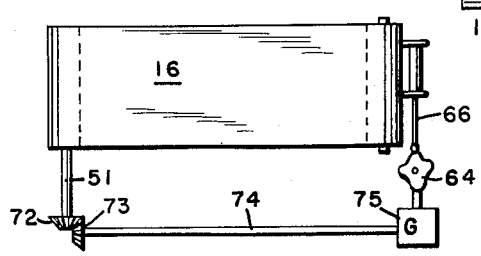
INVENTOR.
LUTHER G. SIMJIAN
BY
Erwin B. Steinberg
AGENT.

United States Patent Office 3,013,345
Patented Dec. 19, 1961

3,013,345
VEHICLE DRIVER TRAINING DEVICE
Luther G. Simjian, Greenwich, Conn., assignor to Reflectone Electronics, Inc., Stamford, Conn., a corporation of Connecticut
Original application Dec. 4, 1957, Ser. No. 700,648. Divided and this application Apr. 20, 1960, Ser. No. 26,396
1 Claim. (Cl. 35—11)

This application is a divisional application of my copending application for U.S. Letters Patent, Serial No. 700,648 entitled "Training Device," filed December 4, 1957.

This invention generally refers to improvements in training devices and has particular reference to a novel and useful means for training, testing, analyzing and recording the actions and reactions of persons in operating certain control mechanisms. More specifically, the invention is related to a classroom training device adapted to present varying visual stimuli to a trainee position and wherein controls at the trainee position may be used to modify certain programmed sequences.

The invention specifically is directed to providing a novel and useful mechanism for teaching persons the handling of power operated vehicles, such as automobiles, boats, airplanes, etc. While the primary object of this training device is the training and instructing of novices, it will be found that the device is equally useful for evaluating the capability and proficiency of drivers possessing already a certain amount of experience and skill. In this manner, the instant training device, as will be apparent from the following description, constitutes an extremely valuable and versatile tool for the ever increasing demand and need for driver education and evaluation.

The recent rapid increase in moving vehicles and the alarming rise of the accident rate with the resultant loss to human life and property has focussed renewed attention on the problem of driver education and driver evaluation and pointed out the need for an apparatus which in a realistic manner would serve to teach and evaluate a driver in his actions and reactions when operating a power-driven vehicle. Such an apparatus in order to be useful must be suitable in connection with driver teaching classes where either a single or a plurality of students is trained.

Although the prior art shows various trainers of this type, many of the prior art devices known and evaluated exhibit severe shortcomings, such as inadequate realism and lack of realistic presentation with regard to wrong actions by an individual student, specifically when group training is involved.

The instant application discloses a trainer which has been designed to overcome the above mentioned shortcomings by providing realism not only to each single student but by designing the trainer in such a manner that it may be used equally well for group training. The trainer is entirely a self-contained unit which is readily transportable for classroom use. Several trainers in parallel may be used in a single installation without affecting the training value at each single station. To this end, the invention provides a trainer which tests the ability of an individual to handle the vehicle controls under numerous situations, these situations occurring on a programmed or random schedule.

In conformity with the foregoing, in its present and preferred embodiment the invention provides a trainee position which is equipped with the usual vehicle controls—in the case of an automobile—steering wheel, gear shift, brake, clutch and accelerator pedals. In front of the trainee position there is disposed a small object which represents a portion of the automobile which the trainee is controlling. A terrain presentation, for instance an endless belt, moves relative to the object, the speed of the belt relative to the object and the lateral position of the object relative to the belt are controlled by the trainee. Means are provided to cause a continuously changing road pattern on the belt. It is the trainee's problem to steer the object in such a manner that the boundaries of the roadway on the belt are not exceeded. The longitudinal speed of the belt is adjustable by the instructor and may be influenced still further by the controls at the trainee position.

One of the objects of this invention is therefore the provision of a novel and improved training device which is useful for teaching and evaluating persons in the operation and handling of power driven vehicles.

Another object of this invention is the provision of a self-contained trainer readily operable in single or plural units.

Another object of this invention is the provision of a driving trainer which presents to a student realistic conditions so as to cause the student to acquire driving skill and proficiency.

Another object of this invention is the provision of a vehicle training device in which the actions taken by the student are apparent to the student at once regardless as to whether individual or group training is involved.

A further object of this invention is the provision of a training device which is equipped with means to present variable and varying road path patterns to the student.

A further object of this invention is the provision of a driving trainer in which certain characteristics of an actual vehicle are simulated.

Further and still other objects of the instant invention will be apparent from the following description taken in conjunction with the accompanying drawings in which:

FIGURE 1 is a view in longitudinal section, partly schematic, of the training device;

FIGURE 2 is a plan view of the training device illustrating more closely portions of FIGURE 1;

FIGURE 3 is a plan view, partly schematic, showing a modification of the drive for the lateral marking means depicted in FIGURE 2; and FIGURE 4 is a plan view showing a modification of the terrain means to provide multi-lane traffic.

Referring now to the figures and FIGURE 1 in particular, numeral 11 identifies a trainee position such as the cab of an automobile which is to be occupied by the student. It will be apparent that such a student position may resemble the operator's position on a ship, aircraft, etc. without departing from the scope of the instant invention. Within this cab there will be found a seat 12, a steering wheel 13, and suitable foot pedals 14.

In view of the trainee's position there is disposed a portion of the vehicle such as the front portion of a hood 15 which may include a hood ornament. This hood portion, or object, is distinct from the cab 11 and is movable laterally with respect to a moving endless belt 16 disposed in front and below the object 15. The endless belt 16 represents visual stimulus means in the form of road information and moves longitudinally toward the object 15.

The terrain belt 16 is driven about spaced rollers 17 and 18 at a speed which represents driving speed. The center axis of roller 18 is supported by means of an elevating mechanism, for instance, a hydraulic cylinder 19 so that the belt at the far end (roller 18) may be tilted upward or downward with respect to object 15 and cab 11 to simulate upgrade or downgrade road conditions. The lateral or transverse motion of object 15 relative to the longitudinal axis of belt 16 is controlled from steering wheel 13. One of the objects of this trainer is to impart steering skill to the student. To this end, cooperating with the belt there is a set of marking rollers 20 which receive a suitable marking liquid from a set of ink rollers 21. Each marking roller 20 is in contact with the belt at roller 18 and is used to mark a lateral boundary representing the limit of a roadway on the belt. After the marking has passed object 15, the marking becomes erased by cleaning means which include a rotary brush 21A revolving in a suitable cleaning solution 22 followed by a hot air drying device 23.

It will be apparent that such marking may comprise pencil marking, inking means, application of magnetic powder, marking by means of heat, application and removal of adhesive tape or similar means without deviating from the principle of the invention.

FIGURE 2 illustrates more closely some of the mechanisms and components involved in operating the device per FIGURE 1. Motor 31 drives the road belt via a coupling 32 and roller 17 about which the endless belt 16 rotates. Belt 16 may be made of fabric, impregnated fabric, plastic material, so that the belt is readily flexible as well as capable of being marked repetitively with road boundaries. The steering wheel 13 via a set of suitable gears 33, 34, and 35 drives a flexible cable 36 which is fastened around the side of gear 35. The flexible cable 36 after being guided about pulleys 37 and 38 is fastened to object 15 so that motion of steering wheel 13 causes a corresponding lateral or transverse motion of object 15 relative to the belt 16.

The speed of driving motor 31 is influenced by the accelerator pedal 41 and gear shift lever 42. Motor 31 is driven from a source of electric energy 43 via conductor 44, a series of toggle switches in parallel, conductor 45 and via adjustable resistor 46. The three switches shown represent first, second and third gear shift position on an automobile and it will be understood that one switch at a time is closed. The switches are actuated by gear shift lever 42 engaging a suitable cam device 47 which in turn closes one of the three toggle switches. It will be seen that the switches, from left to right, pick up increasing voltage so that maximum voltage represents the highest speed gear in an automobile. Rheostat 46 is controlled by the accelerator pedal 41 to simulate the action of the gas pedal in an automobile. It will be apparent that the rheostat 46 may be a shaped function potentiometer to simulate actual characteristics of an engine. For the sake of simplicity the clutch pedal is not shown but it readily can be coupled to cam means 47. It will be apparent to those skilled in the art that as an alternate design actual mechanical gear ratios and gear shifting means may be employed which are coupled between the motor and the roller 17 without departing from the principle shown.

The brake pedal 48 via a flexible cable 49 controls a brake disk and brake shoe arrangement 50 operatively coupled to drive shaft 51 so that operation of brake pedal 48 causes a braking action on drive shaft 51 which is driven by motor 31. Drive shaft 51 still further is provided with an inertia means, flywheel 52, in order that the belt cannot be slowed or accelerated suddenly, but that the motion of the road belt relative to the object 15 is provided with suitable inertia which represents the dynamic characteristics of a moving vehicle. Moreover, an inertia switch 53 in a similar manner is fastened to the drive shaft 51, this inertia switch causing an electrical circuit contact operation during sudden mechanical acceleration or deceleration of the shaft 51. This contact operation is used for scoring purposes to indicate whether sudden acceleration or deceleration due to improper operation of the driving controls has occurred. Switches of this type are well known in the art in conjunction with measuring of acceleration or deceleration and need not be described in further detail.

It will be apparent to those skilled in the art that the adjustment of the brake shoe and brake disk may be made subject to wide variation to simulate varying road conditions. A device of this type may include spring means and clutch facing depending upon the road conditions to be simulated. In this manner, the friction may be changed to simulate conditions involving dry roads to those involving wet roads and icy conditions.

The road marking device involving the establishing of lateral boundaries will be apparent by referring to the following details:

The two marking wheels 20 in contact with ink supply wheels 21 are supported in a movable bracket 61 which is adapted to slide laterally along transverse shaft 62. The bracket 61 is driven along its lateral excursion by means of a motor 63 coupled to an irregularly shaped cam 64 via cam follower 65 and push rod 66. The marking wheels and bracket are resiliently biased toward the cam by spring 67 which is confined between reference point 68 and the brackets 61.

As the motor 63 rotates cam 64, the bracket 61 with marking wheels is in oscillatory motion and causes a pair of lateral boundary marks on belt 16 thereby providing a road 70 defined between the markings. It will be apparent that depending upon the contours of the cam 64, the marked road can be changed from a simple straight road to a continuously curved road and that by changing the distance between the marking wheels, the road may be wide or narrow. Moreover, it wil be observed that the road pattern is changing continuously and that if the cam contour is of sufficient length with respect to the linear length of the belt, the pattern is changing without establishing a repetitive pattern during a single revolution of the belt. If cam 64 is driven at a slow rate the problem presented to the trainee, having to confine object 15 within the lateral boundaries of the road, will be less difficult than when driving cam 64 at a high speed in which case the resultant road pattern will be changing more rapidly. When it is desired to repeat a certain road pattern in a repetitive manner, for instance for the initial phases of training or when simulating a short difficult road, it is obvious that the marking device may be disabled by lifting it away from the belt so that the pattern established on the belt will remain. In this event, it will be necessary to disable also the erasing means comprising brush, bath and blower means 21, 22, and 23 respectively of FIGURE 1. By providing a third marking wheel, disposed between the marking rollers 20 shown, a centerline of the road is achieved.

FIGURE 3 shows a variation and improvement of the apparatus shown in FIGURE 2.

When driving it will be apparent that the road pattern changes with speed to the extent that the time between a pair of curves is influenced by the driving speed. In order to effect the same condition cam 64 is coupled to the motion of the road belt. Drive shaft 51 driven via motor 31 drives belt 16 in the same manner as described above. Drive shaft 51, via a set of bevel gears 72 and 73, and shaft 74 is coupled to a gear mechanism 75 which drives cam 64. In this manner with no motion on drive shaft 51 there will be no motion on cam 64 and the faster the motion on shaft 51, the faster the rotation of cam 64. By providing variable gearing in gear box 75 the occurrence of difficult road patterns may be changed from a slow rate to a fast rate. It will be obvious that the same effect is achieved by controlling motor 63 (FIGURE 2) as a function of drive shaft 51.

FIGURE 4 illustrates a modification of the terrain arrangement wherein belt 16 is provided with two portions, namely portion 16A on the right and portion 16B on the left. Both portions move toward object 15 either in unison or at a differential speed. Objects, obstacles, or vehicles 165 may be mounted on belt portion 16B thereby giving the trainee "driving along" belt portion 16A the illusion of traffic in an adjacent lane.

For matter disclosed herein but not claimed, reference is made to my copending applications for Letters Patent, Serial No. 858,294, filed December 8, 1959, Serial No.

12,649 filed March 3, 1960, and Serial No. 700,648, filed December 4, 1957.

While there have been shown certain specific features and embodiments of the present invention it will be apparent to those skilled in the art that various further and other modifications may be made therein without departing from the spirit and intent of the instant invention which shall be limited only by the scope of the appended claim.

What is claimed is:

In a training device of the type described, the combination of: a fixed trainee station and a movable terrain means visible from said station; said terrain means comprising a set of spaced, stationary rollers and an endless belt means rotatable about the set of rollers; said belt means being divided into two longitudinal portions with a marking, affixed to the belt means, separating both portions to simulate driving lanes; one lane of said terrain means being assigned to a vehicle driving from one point to another along said terrain means, and the other lane being assigned to a vehicle traveling in opposite direction along said terrain means; controls disposed at said station and operable by a trainee located at said station; a simulated front part of a vehicle disposed to be visible to a student located at said station and viewing said terrain means; said simulated vehicle part being disposed above said terrain means and said first stated lane and being movable laterally relative to said lane and fixed station by means of said controls; at least one three dimensional object disposed on said other lane of said terrain means and fastened thereto to cause said belt means when rotated about said rollers to carry said object in the direction toward said station, and the lateral motion of said simulated vehicle part being confined primarily to said first stated lane.

References Cited in the file of this patent

UNITED STATES PATENTS

| | | |
|---|---|---|
| 2,265,598 | Firestone et al. | Dec. 9, 1941 |
| 2,273,091 | De Silva | Feb. 17, 1942 |
| 2,908,087 | Weinreich et al. | Oct. 13, 1959 |

FOREIGN PATENTS

| | | |
|---|---|---|
| 571,863 | Germany | Mar. 6, 1933 |